Inventor
Howard Bane

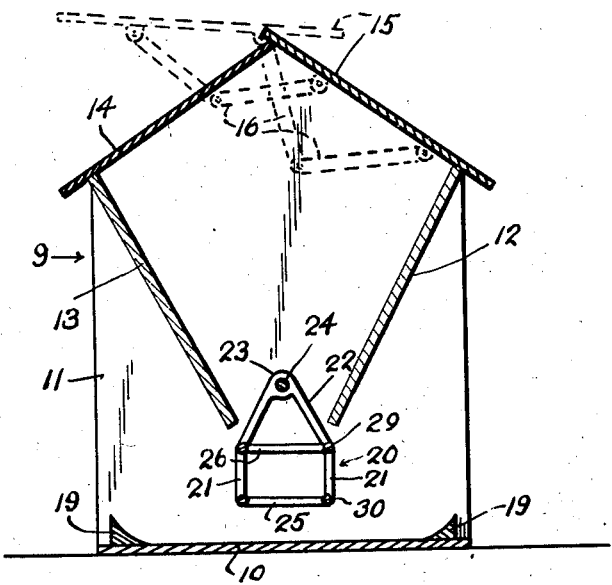
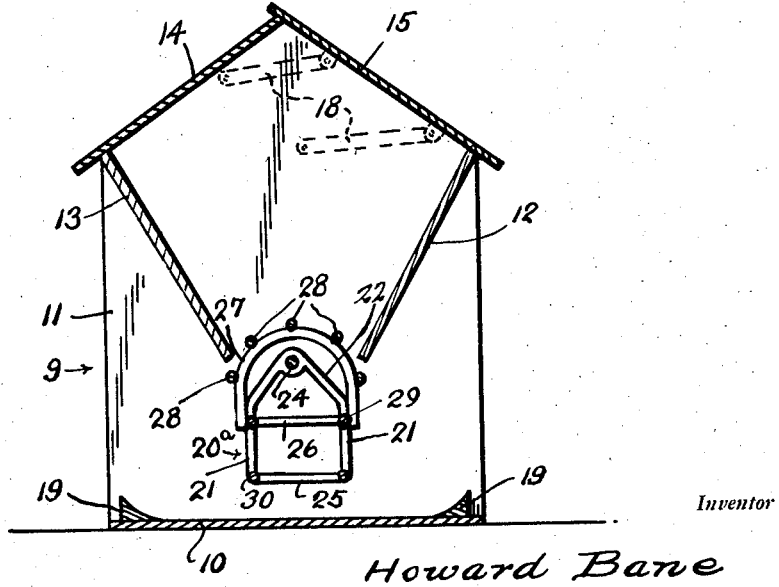

May 29, 1945.  H. BANE  2,377,202
HOG FEEDER
Filed July 30, 1943  3 Sheets-Sheet 3
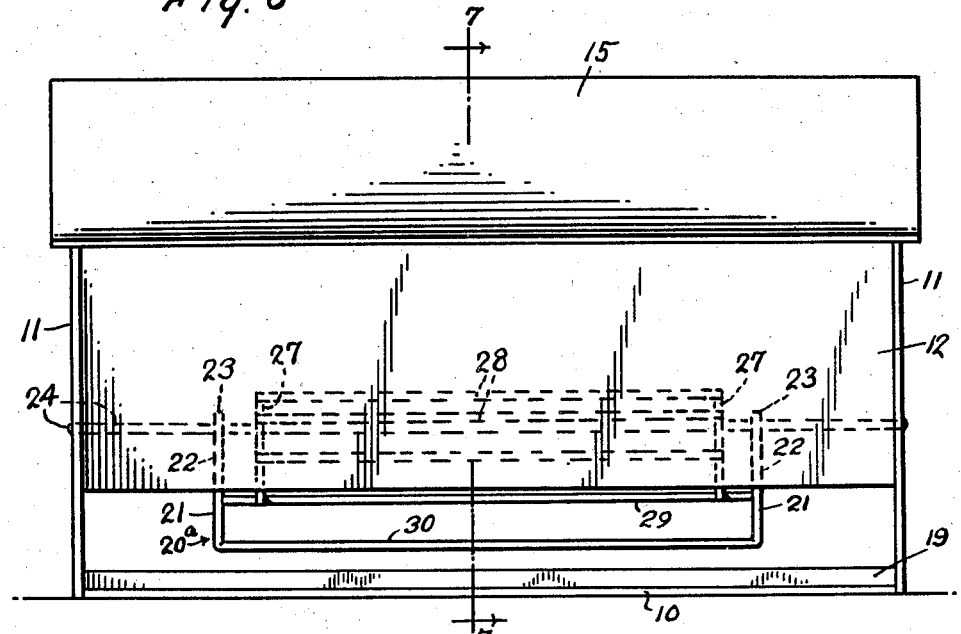
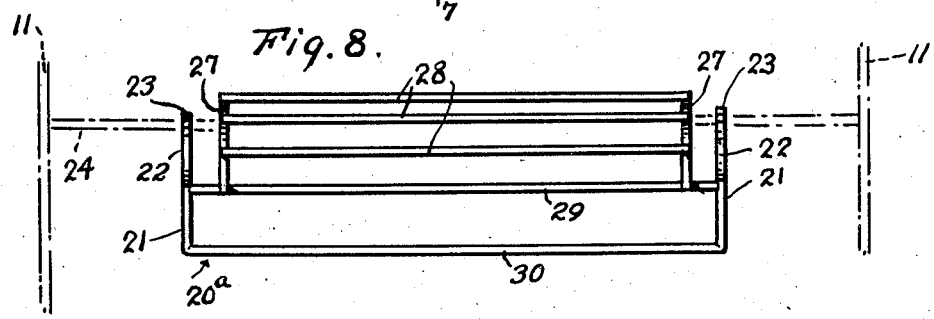
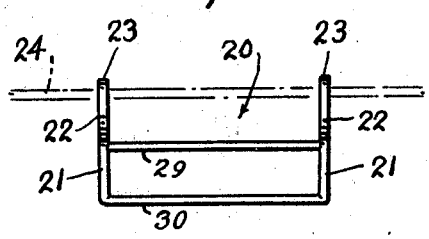
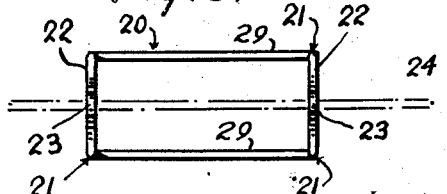
Inventor
Howard Bane
By Clarence A. O'Brien
and Harvey B. Jacobson
Attorneys Patented May 29, 1945

2,377,202

UNITED STATES PATENT OFFICE 2,377,202

HOG FEEDER

Howard Bane, Arrowsmith, Ill.

Application July 30, 1943, Serial No. 496,754

3 Claims. (Cl. 119—54)

This invention relates to hog feeders and has reference to a novel and improved structure possessed of certain appreciable refinements which, collectively considered, contribute to the provision of an arrangement which more aptly fulfills the requirements of a device in the stated category.

More specifically, the invention has reference to a so-called small feeder which relies for its principal novelty on what is believed to be a novel animal-actuated agitator, the latter unit being so designed as to be readily operable while at the same time preventing the contents of the hopper from becoming too tightly packed for efficient functioning.

In carrying out the preferred embodiment of the invention I have evolved and produced a structurally simple and economical arrangement which insures constant gravitation of the feed from the hopper to the receiving trough for ready access to the hogs.

Other objects, features and advantages of the invention will become more readily apparent from the following description and the accompanying illustrative drawings.

In the drawings, wherein like numerals are employed to designate like parts throughout the same—

Figure 3 is a central vertical or cross-sectional view taken on the plane of the line 3—3 of Figure 2 looking in the direction of the arrows.

Figure 4 is a detail elevational view of the type or form of agitator seen in Figures 1 to 3, inclusive.

Figure 5 is a top plan view of the structure appearing in side elevation in Figure 4.

Figure 6 is a view like Figure 2 showing a larger type feeder and a comparatively larger and modified type of agitator employed therein.

Figure 7 is a vertical section on the plane of the line 7—7 of Figure 6.

Figure 8 is an elevational view showing the detailed construction of the amplified or modified agitator depicted in the arrangement seen in Figures 6 and 7.

Figure 1:
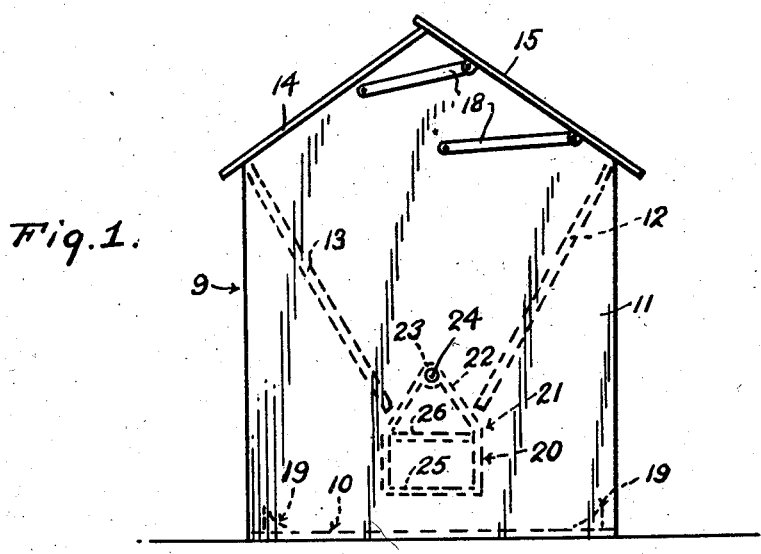
Figure 1 is an end elevation of a small hog feeder constructed in accordance with the principles of the present invention illustrating the simplest form of the invention.
Figure 2:
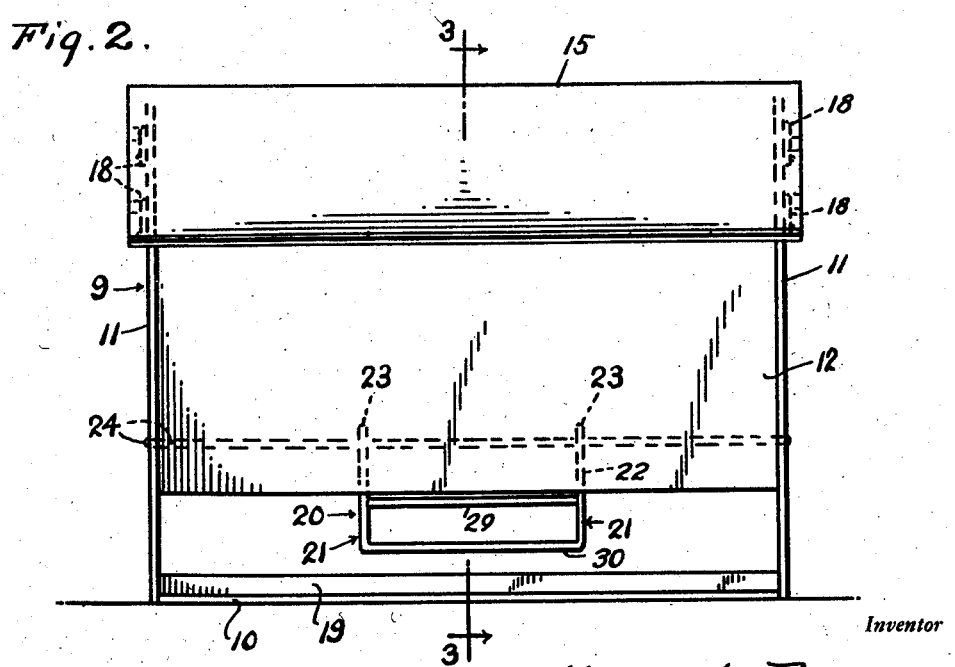
Figure 2 is a side elevation of the structure seen in Figure 1 observing the same in a direction from right to left.

Referring now to the drawings by distinguishing reference numerals and as regards both forms of the invention shown, it will be observed that the feeder as a unit is denoted by the numeral 9. This comprises a horizontal bottom 10, end walls or uprights 11 and intervening converging side walls 12 and 13. The latter walls cooperate with the end walls 11 in defining a hopper for the feed (not shown). The roof comprises an inclined stationary section 14 and a swingable or hingedly mounted section 15, the latter being hingedly mounted in place by pairs of pivotally connected links 16 in Figure 3 and individual links 18 in the arrangement disclosed in Figures 1, 2 and 7. In either case the lid-like section 15 is adapted to be swung open to permit the hopper to be filled or supplied with feed in the customary manner. Horizontal runners or rails 19 are mounted atop the longitudinal outer edge portions of the bottom 10 and serve to define suitable trough portions.

It is to be observed that the feed gravitates downwardly and is delivered into the receiving troughs by way of the slot existing between the lower converging edges of the inclined hopper walls 12 and 13. The principal phase of the invention has to do with the hog actuated agitator device (see Figures 1 to 5 inclusive) denoted, as a unit, by the numeral 20. Generally pictured, this is in the form of an open-work cage-like structure. It comprises a pair of vertical end frames 21 longitudinally spaced from each other and having vertical members with V-shaped upper portions 22 with the vertex portions formed into hinge bearings 23. These bearings 23 are hingedly mounted on a horizontal suspension or hanger rod 24 and the latter is centrally arranged above the discharge slot of the hopper. Rod 24 is sufficiently elevated and attached to the walls 11 as to dispose the inverted V-shaped portions 22 within the lower slotted portion of the hopper. Referring again to the vertical end frames 21, it will be seen that each frame is made up of vertical members merging into V-shaped members whose upper portions form the aforementioned bearings 23. At points below the V-shaped portions, the vertical portions are provided with horizontal cross-braces 25 and 26. In order to complete the aforementioned cage-like structure, I provide upper and lower pairs of parallel rods, these indicated by the numerals 29 and 30, respectively. The rods are arranged in vertically spaced relation and provide longitudinal connections between the two end frames. The major portion of said cage-like structure depends below the slot in the hopper. At this point it is in the position to be engaged as the hogs root in to consume the deposited feed. Therefore, the depending portion of the cage 20 serves as the actuator and the inverted V-shaped portions 22 serve essentially as agitators. By making the cage 20 of open work construction it is evident that it does not blockade the gravitating feed. In fact, the feed flows and drops freely between the bars and frames and is thus unhampered in falling into the troughs.

In the arrangement seen in Figures 1 to 5, inclusive, the agitator is about one-third the length of the complete housing or structure 9.

In Figures 6, 7 and 8 a larger feeder is shown. Likewise, a larger agitator is shown. As far as the agitator 20a is concerned it is the same in fundamental construction as that already described. But in this arrangement there is an added or auxiliary part. This comprises a pair of U-shaped end members 27 having their free ends attached to the horizontal members 26. A plurality of spaced parallel wires or rods 28 are attached to the U-shaped members 27 and as this device rakes back and forth through the feed it serves to more readily dislodge it and keep it free for gravity flowing.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having described the invention, what is claimed as new is:

1. A hog feeder comprising a trough, a feed hopper fixed above the trough and having end walls rigidly connected by downwardly converging side walls, said side walls being spaced at their lower edges to define a bottom outlet, a horizontal hanger rod having its ends supported by the end walls and disposed within the lower portion of the hopper centrally between the sides of and above said outlet, and a cage-like animal-actuated agitator suspended at its ends from said hanger rod, said agitator embodying vertical end frames pivoted at their upper ends to said hanger rod and depending through said outlet, and upper and lower spaced horizontal rods rigidly connecting the lower and intermediate portions of the end frames below said outlet.

2. A hog feeder comprising a trough, a feed hopper fixed above the trough and having end walls rigidly connected by downwardly converging side walls, said side walls being spaced at their lower edges to define a bottom outlet, a horizontal hanger rod having its ends supported by the end walls and disposed within the lower portion of the hopper centrally between the sides of and above said oulet, and a cage-like animal-actuated agitator suspended at its ends from said hanger rod, said agitator embodying vertical end frames pivoted at their upper ends to said hanger rod and depending through said outlet, and upper and lower spaced horizontal rods rigidly connecting the lower and intermediate portions of the end frames below said outlet, inverted U-shaped end members secured at their ends to and connecting opposite sides of the upper horizontal rods near opposite ends of the latter, said end members projecting upwardly through said outlet, and a plurality of spaced parallel rods rigidly connecting said U-shaped end members.

3. A hog feeder comprising a trough, a feed hopper fixed above the trough and having end walls rigidly connected by downwardly converging side walls, said side walls being spaced at their lower edges to define a bottom outlet, a horizontal hanger rod having its ends supported by the end walls and disposed within the lower portion of the hopper centrally between the sides of and above said outlet, and a cage-like animal-actuated agitator suspended at its ends from said hanger rod, said agitator embodying vertical end frames pivoted at their upper ends to said hanger rod and depending through said outlet, and upper and lower spaced horizontal rods rigidly connecting the lower and intermediate portions of the end frames below said outlet, said agitator being positioned centrally between and spaced from the ends of the trough and the hopper.

HOWARD BANE.